United States Patent [19]

McAlister

[11] 4,433,557
[45] Feb. 28, 1984

[54] MULTIPLE FLUID MEDIUM SYSTEM

[76] Inventor: Roy E. McAlister, 5285 Red Rock North, Phoenix, Ariz. 85018

[21] Appl. No.: 212,751

[22] Filed: Dec. 4, 1980

Related U.S. Application Data

[60] Division of Ser. No. 32,639, Apr. 23, 1979, Pat. No. 4,301,862, which is a continuation-in-part of Ser. No. 6,240, Jan. 24, 1979, Pat. No. 4,316,436, which is a continuation of Ser. No. 774,501, Mar. 4, 1977, abandoned.

[51] Int. Cl.³ .............................................. F25B 13/00
[52] U.S. Cl. .................................. 62/324.1; 237/2 B; 62/235.1
[58] Field of Search ............ 237/2 B; 62/238.6, 235.1, 62/324.1; 126/427

[56] References Cited

U.S. PATENT DOCUMENTS

| 4,165,036 | 8/1979 | Meckler | 237/2 B |
| 4,242,872 | 1/1981 | Shaw | 126/427 |

*Primary Examiner*—Albert J. Makay
*Assistant Examiner*—Henry Bennett

[57] ABSTRACT

A multiple fluid medium solar energy system for a building comprising a solar panel mounted exteriorly of the building. Interiorly, there is included a room air temperature conditioning assembly. A pair of heat exchangers are provided which define seven flow paths. A temperature storage water circuit is provided including an insulated water storage tank, a pump for pumping water from the storage tank and a water return line for directing water into the storage tank, and a line for directing water from the pump to the water return line alternatively (1) through the second flow path or (2) the sixth flow path. A heat pump is provided defining a closed refrigerant flow circuit through the third flow path and the seventh flow path and including a reversible compressor for alternatively (1) compressing the refrigerant from the third flow path into the seventh flow path and expanding the refrigerant from the seventh flow path into the third flow path or (2) compressing the refrigerant from the seventh flow path into the third flow path and expanding the refrigerant from the third flow path into the seventh flow path, and a duct system defining (1) an environmental air circuit through the solar panel passages including a blower for causing a flow of air from an environmental air inlet through the solar panel passages into an environmental air outlet and alternatively (2) a closed air circuit through the solar panel passages, the fourth flow path and the blower.

5 Claims, 20 Drawing Figures

Fig. 9. WINTER-SUNNY DAY

Fig. 10. WINTER-CLOUDY DAY OR NIGHT

MULTIPLE FLUID MEDIUM SYSTEM

This application is a division of application Ser. No. 32,639, filed April 23, 1979, now U.S. Pat. No. 4,301,862 which is a continuation-in-part of application Ser. No. 6,240, filed Jan. 24, 1979, now U.S. Pat. No. 4,316,436 which, in turn, is a continuation of application Ser. No. 774,501, filed March 4, 1977, and now abandoned.

This invention relates to heat exchangers and more particularly to an improved heat exchanger construction.

It has long been recognized that to provide an efficient heat exchanger it is necessary to provide for the flow or containment of one fluid medium in sealed relation with respect to a second fluid medium in heat exchange relation. Desirably, the fluid mediums are contained by heat conducting material which interfaces with both fluid mediums throughout a maximum surface area and a minimum thickness. Usually it is desirable to provide for the flow of the two mediums out of contact with one another along a path which is constructed so as to provide for maximum contact with the surface of the heat conducting material. Such a path construction preferably is one which does not set up laminar flow in the fluid as it moves through the path. The provision of a turbulent flow path is particulary desirable in heat exchanger where at least one of the fluid mediums is gaseous. In order to meet these criteria, it is usually necessary to provide a multiplicity of parallel flow paths. Where a multiplicity of parallel flow paths is provided, the problem of construction provided is one of manifolding or providing for a single flow into and a single flow out of the multiple parallel paths.

It is an object of the present invention to provide a heat exchanger construction which meets the above-mentioned criteria and provides for a simple and effective manifolding of a multiplicity of parallel flow paths within a heat exchanger. In accordance with the principles of the present invention this objective is obtained by forming the heat exchanger of a plurality of elongated strips of heat conducting material secured together to define at least one elongated passageway extending in the direction of elongation of the strips. The plurality of strips is then wound in coil formation, preferably spirally, and sealing material is provided between portions of the spirally wound strips defining adjacent volutes at two annularly spaced positions. Manifolding is then accomplished by providing the portions of the spirally wound strips at the aforesaid annularly spaced positions and the sealing material secured thereto with a pair of bores. One of the bores constitutes a fluid medium inlet space communicating peripherally with the passageway at each volute for receiving a flow of fluid medium and directing the same into the passageway at each volute for flow therefrom in both annular directions. The other of the bores constitutes a fluid medium outlet space which communicates peripherally with the passageway at each volute for receiving the flow of fluid medium in the passageway at each volute in both annular directions and directing the same outwardly therefrom. The heat exchanger also includes means for directing a flow of a second fluid medium in an axial direction between adjacent volutes of the coil formation throughout the annular extent thereof between the two annularly spaced positions where the sealing material prevents communication between the second fluid medium and the fluid medium flowing from the inlet space through the passageway at each volute in both annular directions into the outlet space.

The construction as noted above has applicability to heat exchangers in which the fluid which flows from the inlet space through the passageway at each volute in both annular directions into the outlet space is a fluid medium either at high pressure or at relatively low pressure. Where relatively high pressures are to be encountered, it is preferable to construct the heat exchanger of strips having opposite surfaces knurled. Alternatively, the opposite surfaces of the strips may be corrugated, in accordance with the teachings contained in U.S. Pat. No. 574,157. Where low pressure fluid is used in the heat exchanger, it is within the contemplation of the present invention to utilize strips providing a passageway which is uniform in cross-sectional configuration throughout its longitudinal extent.

Another advantage of the present construction is that by spirally winding the strips in a coil formation in a direction in which the passageway is disposed spirally it becomes readily possible to provide a series of side-by-side spiral passages. This construction provides for the handling of three or more fluid mediums in heat exchange relationship with one another.

A heat exchanger having this multiple fluid medium heat exchange capabiltiy is particularly useful in systems embodying multiple circuits which are interrelated in heat exchange relation. For example, the present invention comtemplates an improved system for utilizing solar energy in a building which includes a solar panel fluid circuit and a heat pump arrangement which includes a closed refrigerant circuit and a room air temperature conditioning circuit, the three circuits being interrelated in accordance with the principles of the present invention by the utilization of a multiple fluid medium heat exchanger constructed in accordance with the principles enunciated above.

Accordingly, it is a further object of th present invention to provide an improved fluid medium system for a building utilizing solar energy as indicated above.

These and other objects of the present invention will become more apparent during the course of the following detailed description and appended claims.

The invention may best be understood with reference to the accompanying drawings wherein an illustrative embodiment is shown.

Figure 1:
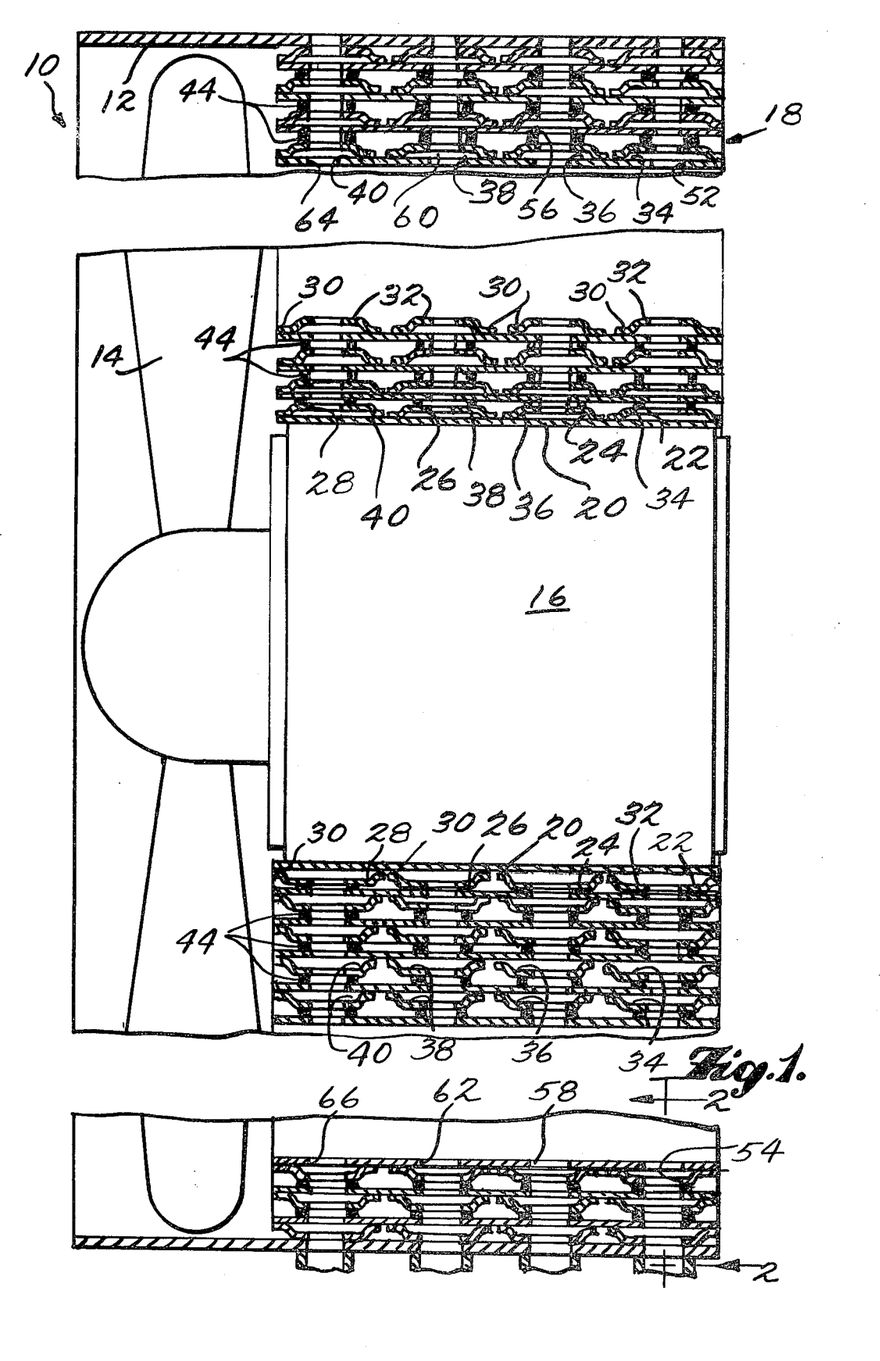
FIG. 1 is a vertical sectional view of a preferred form of heat exchanger assembly embodying the principles of the present invention.
Figure 2:
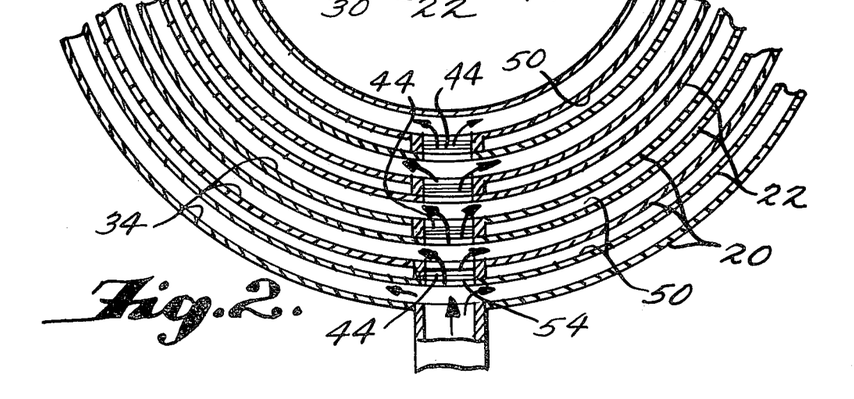
FIG. 2 is a fragmentary sectional view taken along the line 2—2 of FIG. 1.

Referring now more particularly to the drawings, there is shown in FIGS. 1 and 2 a heat exchanger assembly, generally indicated at 10, which embodies the principles of the present invention. The heat exchanger assembly 10 is particularly suited for utilization within a fluid medium system for a building and as such includes a cylindrical outer housing shell 12 which is adapted to be mounted within a duct structure of the building forming a part of the room air temperature conditioning circuit. The heat exchanger assembly 10 preferably also embodies a blower means which includes a fan blade 14 and an electric motor 16 having an output shaft to which the fan blade 14 is drivingly connected. The motor 16 includes a housing which has a cylindrical exterior periphery and a heat exchanger structure, generally indicated at 18, is mounted between the exterior periphery of the motor 16 and the interior periphery of the housing shell 12 and serves to effect the rigid securement of the blower means within the housing shell.

The heat exchanger structure 18 shown in FIGS. 1 and 2 illustrates one preferred embodiment of the present invention. Basically the heat exchanger structure 18 is formed of a plurality of elongated strips secured together and wound spirally into a coil formation. As shown, the strips include a first strip 20 which preferably, prior to the formation of the structure 18, consists essentially of a flat metallic strip. In the embodiment shown in FIGS. 1 and 2, the plurality of strips which make up the structure 18 also include four separate strips 22, 24, 26 and 28, each of which prior to the formation of the structure 18, is likewise constituted by an elongated flat metal strip, however, the width of each of the strips is substantially less than the width of the strip 20, namely, approximately one-fourth the width size. Each of the narrower strips 22, 24, 26 and 28, prior to the formation of the structure 18, has its opposite marginal edge portions bent downwardly and then outwardly to form marginal side attaching portions 30 and a central flat portion 32. As shown, each of the narrow strips 22, 24, 26 and 28 is sealingly secured to the wide strip 20 in side-by-side relation by suitably welding the side attaching portions 30 to the contacting surface of the wide strip 20 continuously throughout the longitudinal extent of the strips. The securement of the side attaching portions of the four strips 22, 24, 26 and 28 to the wide strip 20 defines the sides or width of four elongated passageways 34, 36 38 and 40 respectively. The longitudinal extent of each of the passageways is defined by the parallel facing surfaces of the central portion 32 of the associated narrow strip and the coextensive surface of the strip 20 between the associated attaching portions 30. In the assembly thusfar described there are provided four elongated longitudinally extending passageways 34, 36, 38 and 40 which are generally parallel with respect to one another and extend longitudinally in the direction of longitudinal extent of the strips.

Figure 3:
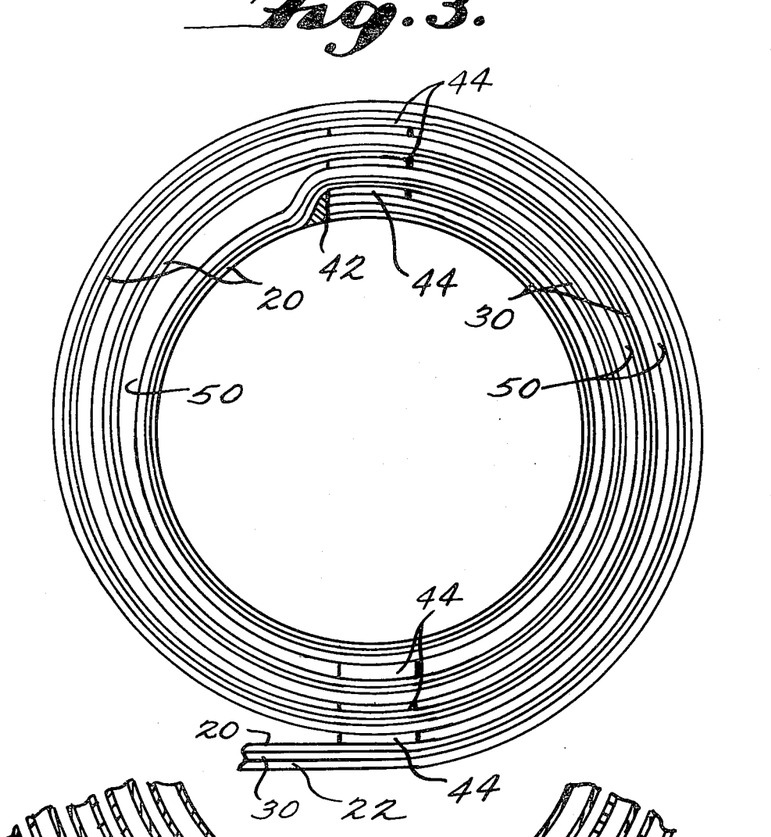
FIG. 3 is a fragmentary side elevational view illustrating the spiral winding of the heat exchanger strips in accordance with the principles of the present invention.

Referring now more particularly to FIG. 3, after the plurality of strips 20, 22, 24, 26 and 28 have been rigidly secured together in the manner described above, the assembly is then spirally wound as indicated in FIG. 3. In this regard it will be noted that the inner end of the assembly of strips is provided with sealing material 42 which may be of any desirable material (e.g. plastic) and, as shown, is preferably a brazing metal. The sealing material 42 serves to seal the inner end of the passageways 34, 36, 38 and 40. The assembly is then spirally wound in a first cylindrical volute, the inner periphery of which is defined by the wide strip 20. Just prior to the start of the second volute of the spiral winding a sealing block assembly 44 is mounted between the radially outwardly facing exterior surface of each of the strips 22, 24, 26 and 28 and the radially inwardly facing interior surface of the wide strip 20 which extends thereover. As best shown in FIG. 2, each sealing block assembly includes a spacer block 46 of metal provided with a coating throughout the exterior surfaces thereof with a sealing material such as a brazing metal. As the second volute of the spiral winding continues beyond the postion where the sealing block assemblies 44 are mounted, the radially inwardly facing surface of the wide strip 20 which has engaged the sealing block assembly is curved so as to be spaced from the radially outwardly facing exterior surfaces of the strips 22, 24, 26, and 28.

At an annularly spaced position which is preferably diametrically opposed from the position in which the first set of sealing block assemblies 44 is mounted, there is mounted a second set of sealing block assemblies 44 which are interrelated between the volutes of the spiral winding in the same manner as previously described. The structure 18 is formed by proceeding with the spiral winding and providing a set of sealing block assemblies between the volutes at two radially extending positions which are annularly spaced and, as shown, disposed 180° from one another. It will be understood that the outer end of the winding is suitably fixed in position and has the adjacent ends of the passageways 34, 36, 38 and 40 sealed in a manner similar to that previously described with respect to the inner ends thereof.

Where the sealing assembly is formed of heat activated material such as brazing metal, after the spiral winding has been completed the structure must be placed in an oven or subjected to heat so that the sealing material will sealingly contact and conform to the surfaces of the strips to which they have been engaged. It will be noted that with the configuration thus provided there are formed a multiplicity of axially open fluid passages 50 which are provided throughout the annular extent of the heat exchanger structure except at the aforesaid positions where the sealing block assemblies 44 have been secured. In the operation of the heat exchanger assembly 10, fan blade 14 serves to induce a flow of air axially through the spaces 50 of the heat exchanger structure 18. As previously indicated, where the housing shell 12 is mounted as part of the duct work of a room air temperature conditioning circuit, the air flowing through the spaces 50 constitutes one of the plurality of fluid mediums which are brought together in heat exchange relationship within the heat exchanger assembly 10. In the embodiment thusfar described the four passageways 34, 36, 38 and 40 define four flow paths for the flow of four other fluid mediums so that the assembly 10 provides for the heat exchange relationship between five separate fluid mediums. It will be understood that the plurality of fluid mediums which can be accommodated may be as little as two and greater than five, if desired.

The manner in which each fluid medium is directed into and out of each of the passageways is an important aspect of the present invention. With reference to the passageway 34 defined by the strips 20 and 22, which after the structure 18 has been assembled follows a spiral path, the introduction of the associated fluid medium to the passageway is provided by drilling or boring radially inwardly through the portions of the spirally wound strips at one of the aforesaid annularly spaced positions and the sealing block assemblies secured thereto so as to form circular openings 52 therein defining a cylindrical inlet space extending through the outer housing shell 12 to the inner volute of the side strip 20. It will be noted that this cylindrical inlet space communicates peripherally with the passageway 34 at each volute so that a fluid medium flowing into the cylindrical space will be directed outwardly into the passageway 34 at each volute thereof in both annular directions. In a similar manner the portions of the strips 20 and 22 and sealing block assemblies 44 at the other annularly spaced position are bored or drilled radially to form openings 54 therein which define a cylindrical outlet space communicating peripherally with the passageway 34 at each volute so as to receive fluid medium flowing in the passageway in both annular directions and to direct the same outwardly from the cylindrical outlet space.

In this way, passageway 34 provides multiple parallel heat exchange flow paths for a fluid medium which is introduced into the inlet space 52 and dicharged from the outlet space 54. Each of the remaining passageways 36, 38 and 40 is likewise manifolded, the passageway 36 being provided with a cylindrical inlet space 58 and a cylindrical outlet space 58; the passageway 38 being provided with a cylindrical inlet space 60 and a cylindrical outlet space 62; and the passageway 40 being provided with a cylindrical inlet space 64 and a cylindrical outlet space 66.

The utilization of four separate strips 22, 24, 26 and 28 serves to insure that a leakage which may occur by virtue of the failure of the weld securement between the associated end portions 30 with the strip 20 will discharge into the air stream or space 50. However, by separating the strips the heat conductivity between the fluid mediums in adjacent passageways is reduced somewhat in comparison with a construction in which the four strips 22, 24, 26 and 28 are formed from a single strip. Such a construction is, however, clearly within the contemplation of the present invention because of the enhanced heat conductivity characteristics thereof. The disadvantage of this construction is that failure of the sealing securement of the marginal portions 30 between adjacent passageways will result in the leakage of the fluid medium in one passageway into the other passageway, rather than the spaces 50. In many instances where the nature of the fluid mediums within the passageways is such that they should not be contaminated by comingling with one another, the construction shown in FIGS. 1–3 will be preferred over the integral arrangement.

Figure 4:
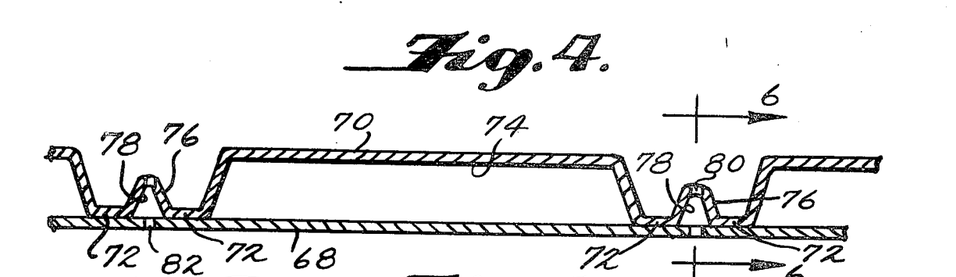
FIG. 4 is an enlarged fragmentary sectional view illustrating the cross-sectional configuration of a modified form of strips prior to being spirally wound.
Figure 5:
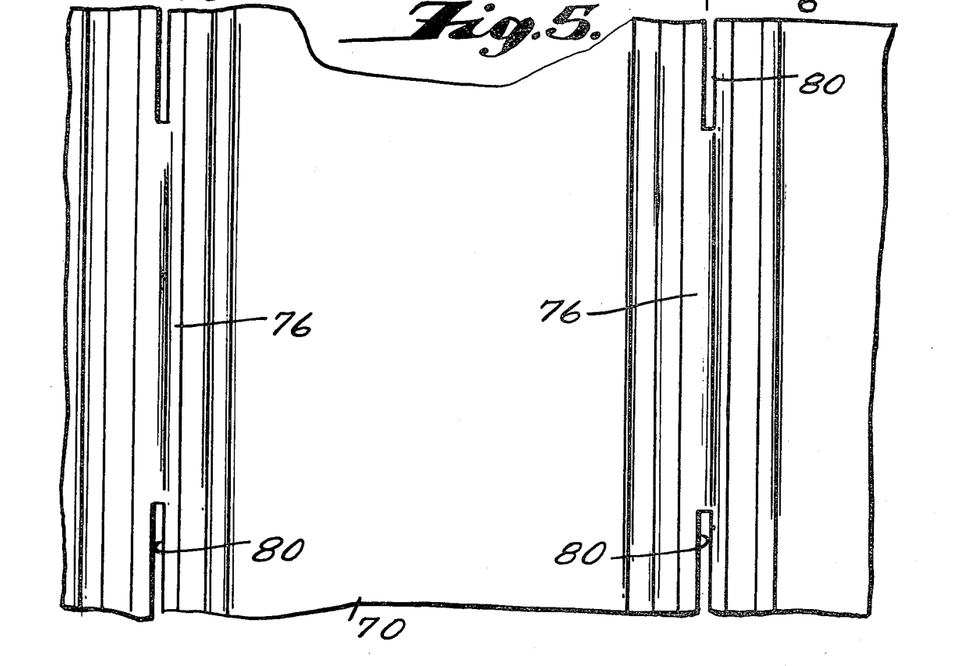
FIG. 5 is a fragmentary top plan view of the structure shown in FIG. 4.
Figure 6:
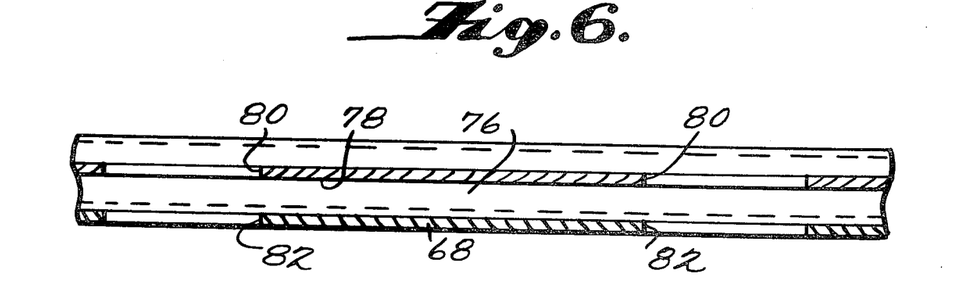
FIG. 6 is a fragmentary sectional view taken along the line 6—6 of FIG. 4.

FIG. 4 illustrates a construction which provides the advantages of both of the above-noted constructions without a full measure of the disadvantages thereof. In the construction shown in FIG. 4, the plurality of strips which make up the heat exchanger structure includes just two strips, one strip indicated by the numeral 68 is comparable to the strip 20 previously described in that it initially is of flat elongated constuction. The other strip, indicated at 70, has an initial width greater than the width of the strip 68. This strip is bent so as to provide a multiplicity of side attaching portions 72 which are similar to the attaching portions 30 previously described. As before, each of the attaching portions 72 is welded or otherwise rigidly sealingly secured continuously throughout its longitudinal extent with the strip 68. As before, the portions 72 define the width or sides of an elongated passageway 74. Also, as before, the longitudinal extent of the passageway is defined by a central flat portion of the strip 70 and a coextensive portion of the strip 68. In FIG. 4 only one full passageway 74 and parts of two others are shown, it will be understood that the arrangement can include four passageways, as in the structure 18, or any other desired number.

It is of significance to note that between adjacent attaching portions 72 associated with adjacent passageways 74, the metal of the strip 70 is formed into a longitudinally extending ridge configuration 76 the interior surfaces of which define with the coextensive opposed surfaces of the strip 68 an elongated leakage chamber 78. The height of the chamber 78 is preferably less than the height of the associated passageways 74. Formed in the apex of each ridge 76 in longitudinally spaced relation is a plurality of elongated slots 80 and preferably corresponding slots 82 formed in coextensive relation within the strip 68.

It will be understood that with the construction described above embodying the two strips 68 and 70, a heat exchanger structure is formed by spirally winding these strips secured together in the fashion previously indicated into a coil formation utilizing sealing block assemblies in much the same manner as previously described in the heat exchanger assembly 10. The advantage of the resultant construction utilizing the two strips 68 and 70 is that the path of heat conduction between adjacent passageways includes integral metal of both strips, rather than just one, and therefore an increase in the heat conductivity between passageways in comparison with the construction embodied in the assembly 10. Moreover, the arrangement provides for leakage to the atmosphere from any one passageway through the adjacent leakage chamber, rather than leakage between chambers, as would be the case where only two strips are utilized without the provision of leakage chambers between adjacent passageways.

Figure 7:
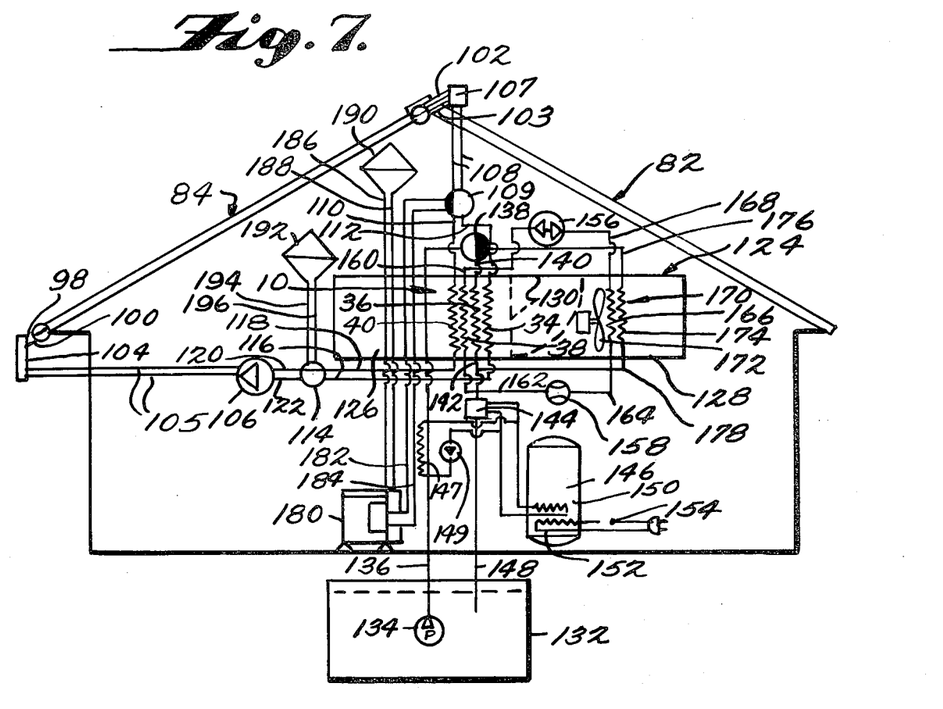
FIG. 7 is a schematic view of a fluid medium system within a building which embodies the heat exchanger assembly of the present invention.
Figure 8:
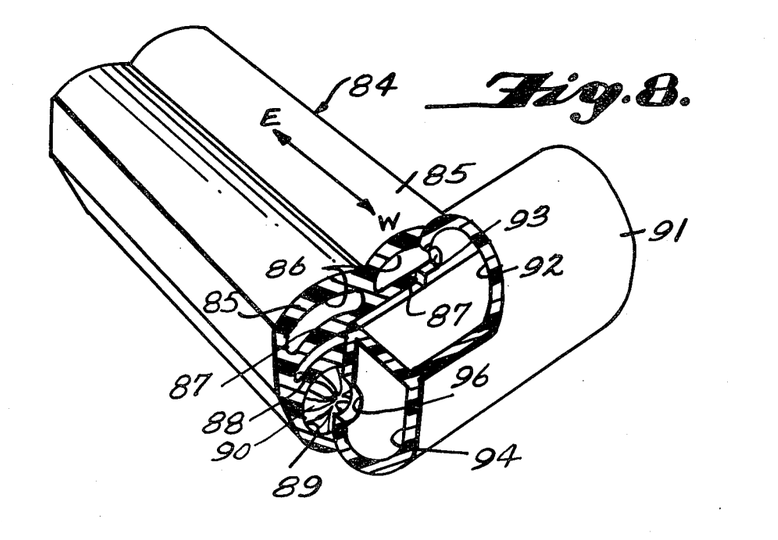
FIG. 8 is a fragmentary perspective view illustrating a portion of the solar panel utilized in the system shown in FIG. 7.

Referring now more particularly to FIG. 7, there is shown therein a fluid medium system for a building, schematically illustrated at 82. It will be understood that the building may be a dwelling, business office or other industrial installation where it is desired to provide temperature conditioned room air and other temperature conditioned fluid circuits, such as a hot water circuit and clothes drier circuit. The building 82 shown embodies a solar panel assembly, generally indicated at 84, in one side of the roof which is most advantageously presented to the sun. It will be understood that while the solar panel is shown as being included in only one side of the roof, it may be embodied in all of the roof and in the walls of the building which are presented toward the sun as well. The solar panel assembly 84 may be of any suitable design, however, as shown it is preferably constructed in accordance with the teachings contained in my copending applications Ser. No. 860,779 filed Dec. 15, 1977, which is a continuation-in-part of application Ser. No. 696,366, filed June 15, 1976, now abandoned; and my co-pending application Ser. No. 6,754 filed Jan. 26, 1979. For purposes of the present applicatin it is sufficient to note, as shown in FIG. 8, that the solar panel assembly 84 includes a plurality of panels, each of which consists of an extrusion suitably mounted on the roof so as to extend from the ridge to the gutter or across the roof, as disclosed in my concurrently filed co-pending application, Ser. No. 32,634, filed April 23, 1979. entitled LAPPED SOLAR PANEL INSTALLATION, now U.S. Pat. No. 4,261,338. Each panel includes a series of side-by-side parallel passages or cells defined by thin wall sections. As shown, outer thin wall sections 85 are provided, each of which has a lens-shaped cross-sectional configuration suitable to receive radiant energy and provide wide angular access thereof with optical concentration to an associated outer passage 86. An intermediate thin wall section 87, also of lens configuration in cross-section, defines the lower portion of each outer passage 86 and further serves to provide optical concentration of the radiant energy through an associated intermediate air insulating passage 87 into an associated lower passage 89. As shown, each lower passage 89 is generally of circular cross-section and has secured to the walls thereof a fibrous matrix of material 90 which extends throughout the space provided by the passage 89 so as to provide mass transport of collected energy. It will be understood that solar panel assembly 84 is suitably manifolded by providing a dual manifold tube 91 at each end of each panel structure. Manifold tube 91 includes an interior wall defining an upper passage manifold space 92, communicating with upper passages 86 through side wall openings 93 and a lower passage manifold space 94 communicating with the lower passages 89 through side wall openings 96. A preferred method and apparatus useful in accomplishing the manifolding is disclosed in my concurrently filed application Ser. No. 32,635, filed April 23, 1979, entitled METHOD AND APPARATUS FOR MANIFOLDING MULTIPLE PASSAGE SOLAR PANEL, now U.S. Pat. No. 4,319,871. For further details of construction of the panels, the manifolding and the mounting thereof, the disclosure of all of the above-identified patent applications are hereby incorporated by reference into the present specification.

As schematically illustrated in the drawings, the manifold spaces 92 and 94 of the lower manifold of the panel assembly 84 are each connected with a pair of inlet lines 98 and 100, each pair of which communicates with on opposite ends of the associated manifold space. Likewise, there are provided two pairs of outlet lines or conduits 102 and 103. The inlet lines have connected thereto a selector valve 104 which receives air through lines 105 from a blower or fan 106 operable, to establish a flow of air from the inlet lines 105 through valve 104 and into the selected manifold space 92 or 94 through selected lines 98 or 100, respectively. From the selected lower manifold space air flow through the communicating passages of the panel assembly 84 to the other corresponding manifold space and then outwardly through the associated lines 102 and 103 into a flow divertor 107. Flow divertor 107 has a pair of lines 108 leading therefrom to a valve 109 which in one position directs the flow of air into two lines 110 and 112. With reference to FIG. 1, line 110 is connected with the inlet space 52 of the heat exchanger assembly 10 while line 112 is connected with the inlet space 64 thereof. The outlet spaces 52 and 64, respectively, are connected to a second control valve 114 through lines 116 and 118, respectively. Valve 114 in one position of adjustment serves to connect lines 116 and 118 to the suction side of the fan 106 as by lines 120 and 122, thus providing a complete closed circuit for the air medium which picks up the solar energy.

It will be noted that the housing shell 12 of the assembly 10 forms a part of a duct system, generally indicated by 124. The heat exchanger assembly 10 is associated with a first return air inlet duct section 126, the discharge end of which leads into the inlet end of a second duct section 128. The outlet of the duct section 128 provides the outlet for a room air temperature conditioner circuit within the building. It will be understood that the duct system 124 is shown schematically and that it may embody conventional forms in actual practice within the building. It is important note, however, that between the duct sections 126 and 128 ther is a schematic valving flap 1330 which in one position connects the discharge end of the duct section 126 to the inlet end of the section 128 and in another position, shown in dotted lines in FIG. 7, closes off the discharge end of the duct section 126 and provides a by-passing return air inlet end for the duct section 128.

In conjunction with the solar energy fluid medium circuit previously described, the system shown in FIG. 7 also includes a hot water circuit. This circuit includes an insulated water storage tank 132 which is schematically shown as being provided in the ground below the basement level of the building 82. The exterior walls of the tank 132 are preferably suitably insulated and the interior thereof is provided with anti-convection cells (not shown) which preferably consist of a sheet of heat insulating material fixed to a corrugated sheet and rolled up into a spiral formation similar to the manner in which corrugated monolithic structures utilized in catalytic converters are made. The purpose of these anti-convection cells is to retard heat transfer through convection currents within the liquid contained within the tank 132.

A pump 134 is provided for drawing water from the tank 132 into a line 136 which leads to a valve 138. In one position, the valve 138 serves to direct water in the line 136 into a line 140 which is connected to the inlet space 56 of the heat exchanger assembly 10. The corresponding outlet space 58 of the heat exchanger assembly 10 connects with a line 142 leading to a valve 144. In one position of the valve 144 the liquid in the line 142 is directed to flow through a coil 146 and then back through the valve 144 to a line 148 which returns the liquid to the tank 132. In the other position of the valve 144, the liquid within line 142 flows directly into line 148 by-passing the coil 146.

Coil 146 forms one source of heat for warning hot water circulated through a hot water supply tank unit 150. The potable hot water supply tank unit 150 is preferably constructed in accordance with the disclosure contained in my concurrently filed application Ser. No. 32,636, filed April 25, 1979, now U.S. Pat. No. 4,265,220, entitled MULTIPLE FLUID MEDIUM SYSTEM AND IMPROVED HOT WATER SUPPLY TANK ASSEMBLY UTILIZED THEREIN which disclosure is hereby incorporated by reference into the present specification. The hot water supply applicance 150 includes an auxiliary heating means for the water which in turn heats the potable water. As shown, the auxiliary heating means is in the form of an electrical resistance heater coil 152, the energization of which is controlled by switch 154. Coil 147 and pump 149 in close circuit with coil 146 form another path for warning hot water in unit 150.

Also included as a fluid medium circuit within the system is a heat pump arrangement of conventional design which includes a closed refrigerant circuit including a compressor 156 and an expansion valve assembly 158. Both the compressor 156 and expansion valve 158 are provided with means by which a circuit reversal therethrough can take place, all in accordance with known practice. In one mode, compressed refrigerant from the compressor 156 is fed into a line 160 which line leads to and is connected with inlet space 60 of the heat exchanger assembly 10. The communicating passageway 38 functions as a coil in the circuit. The communicating outlet space 62 communicates with the expansion valve assembly 156, as by a line 162. A line 164 extends from the expansion valve assembly 158 and leads to the inlet of a coil 166, the outlet of which is communicated with the opposite side of the compressor, as by a line 168 to complete the closed circuit. In the reversing mode, compressor 156 pumps refrigerant to line 168, through coil 166, line 164, through expansion valve assembly 158, line 162, through coil 38 and line 160 back to the compressor.

The coil 166 forms a part of a second heat exchanger assembly 170, one passageway of which corresponds with the internal passage of the coil 166. The heat exchanger assembly 170 is constructed like the assembly 10 except that only two passageways are provided rather than the four provided in the assembly 10. It will also be understood that the assembly 170 may be provided with a blower 172 similar to the blower provided by the motor 16 and fan blade 14. In this regard, the blower function may be eliminated from the assembly 10 in the system as presently described if desired, the blower 172 functioning to effect flow through the heat exchanger structure 18 thereof. The other passageway of the heat exchanger assembly 170, indicated by a coil 174, has its inlet connected as by a line 176 to the valve 138 and its outlet connected to the valve 144 as by a line 178. Coil 174 with its inlet line 176 and outlet line 178 form a part of the hot water circuit.

The system also includes a hot air clothes drier assembly 180. The assembly 180 is connected to function alternatively with the hot air communicating from the solar panel and to this end there is provided a pair of lines 182 and 184 extending from the valve 108 to the drier assembly 180. Hot air fed to the assembly 180 is allowed to exhaust therefrom through lines 186 and 188 to the atmosphere through a roof vent schematically illustrated at 190. When vent 190 is in operation an atmospheric inlet pipe 192 provides an air source for flow through the solar panel assembly 84. As shown, the air inlet 192 is connected to the blower through valve 114 by means of lines 194 and 196 leading to the valve 114. In areas where summer night temperatures are sustained above 85° F. to 95° F., it is within the contemplation of the present invention to add an additional heat sink to the system described above. An evaporative fountain or water tower heat sink (not shown) serving as a water cooler is preferably utilized. Water by evaporation is circulated through a fifth liquid flow circuit embodied in the heat exchanger assembly 10.

Figure 9:
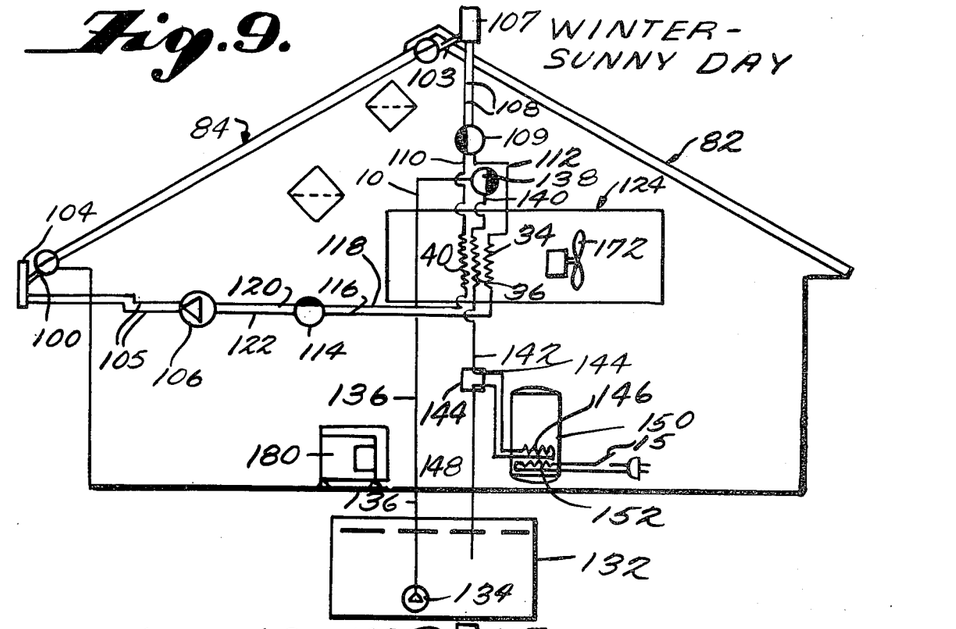
FIG. 9 is a schematic view similar to FIG. 7 illustrating the working components of the system in conditions represented by a winter sunny day.

The operation of the system shown in FIG. 7 can best be understood with reference to the schematic hook-up drawings shown in FIGS. 9-12. FIG. 9 illustrates the hook-up of the system during a suuny day in winter where conditions are such as to make it desirable to increase the temperature of the room air so as to maintain it at a comfortable level above the level of the temperature outside. Under these conditions, the solar energy which is environmentally available is transmitted to the air flowing in the channels 89 of the solar panel assemblies 84 and this air is circulated by the blower or fan 106 through a closed circuit which includes lines 102 and 104, valve 108, lines 110 and 112, inlet spaces 52 and 64, passageways 34 and 40, outlet spaces 54 and 66, lines 116 and 118, valve 114 and lines 120 and 122, which lead back to the fan 106. As the cooler return air enters the inlet side of duct section 182, the air will pass axially through the openings 50 in the heat exchange structure 18 in heat exchange relation to the fluid mediums flowing in passageways 34 and 40 therein. In this way the air is heated so that it enters the rooms of the building at a desired elevated temperature. It will be understood that appropriate automatic thermostatic control may be provided if desired to effect intermittent operation of the fan 172 to achieve the desired temperature control. During this time, so long as the heat availabe in the solar panel circuit is sufficient to provide the necessary room air heat, the heat pump circuit is not operated.

In the operation of the hot water circuit, pump 134 delivers heated water from tank 132 through line 136 to the heat exchanger 10 through valve 138. After picking up heat during the heat exchange relation with the solar panel circuit, the hot water flows into line 142 through valve 144 and finally from line 148 back into tank 132. Where the demand for hot water in the hot water circuit is such that heat must be added to the hot water appliance 150, valve 144 is actuated to cause the hot water circuit to flow from line 142 through the coil 146 to the line 148. At times when no additional heat need be added to the hot water system, valve 144 is actuated to by-pass the coil 146.

Figure 10:
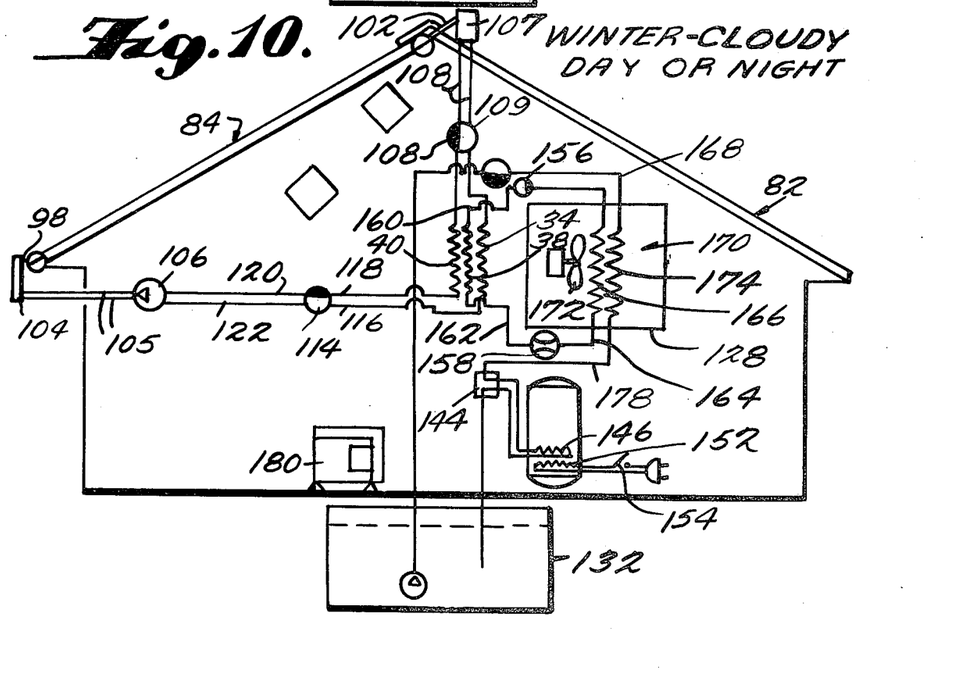
FIG. 10 is a schematic view similar to FIG. 7 illustrating the working components of the system in conditions represented by a winter cloudy day or night.

FIG. 10 illustrates the connection of the circuit during cloudy days or nights during the winter. During this time the circuit through the solar panel assembly 84 is similar to that previosuly described in connection with FIG. 9. However, since the flow of air in the solar panel circuit is not being heated by solar energy, flap 130 is moved so that the room air is no longer allowed to flow through the heat exchanger 10. Instead, all the room air flows throuh the duct section 128 and heat is added to the air by means of coil 174 containing heated water from storage tank 132, the water circuit being changed from that previously described by actuating valve 138 so that flow from the pump line 136 goes to the coil 174 and back to the valve 144 through line 178. Where the temperature of the storage tank water is no longer adequate to meet the heating requirements, heat is added by the heat pump circuit in which case compressor 156 delivers compressed refrigerant into line 168 so that the heated refrigerant in coil 166 can give up its heat to the room air flowing in heat exchange relationship thereby. The refrigerant from coil 166 flows into line 164, through expansion valve assembly 158 and into line 162. From the line 162, the refrigerant flows through the passageway 38 of the heat exchanger assembly 10 in heat exchange relationship with respect to the solar panel circuit. The expanded refrigerant in passageway 38 which is cold takes heat from the solar panel flow of air through passageways 34 and 40. In order to render the heat pump circuit more efficient, particularly at nigh time when the demand for hot water will be considerably less, valve 138 can be actuated to direct the flow of hot liquid from the storage tank through passageway 36 of the heat exchanger 10 to provide heat exchange with the cold refrigerant in passageway 38. Under these circumstances the fan 106 is preferably shut down to prevent flow through the solar panel assembly 84.

In conditions where the heat pump circuit is still insufficient to provide the necessary heat for elevating the room air temperature, switch 154 can be actuated to add heat into the water of the hot water appliance 150 by heating the electrical coil 152. Under these circumstances, valve 38 is actuated to direct the flow of water from the tank 132 through coil 36 of the second heat exchanger 10 and valve 144 is actuated to direct the water from the coil 36 in series through the coil 146 so that the flow of hot water back to tank 132 will pick up heat from the heating appliance 150 applied by the electrical coil 152.

Figure 11:
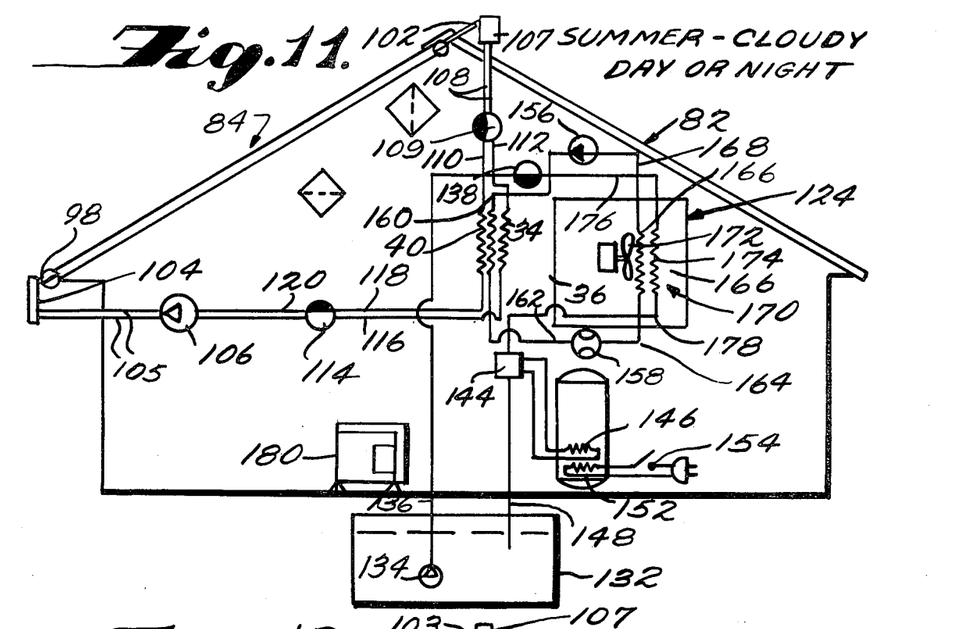
FIG. 11 is a schematic view similar to FIG. 7 illustrating the working components of the system in conditions represented by a summer cloudy day or night.
Figure 12:
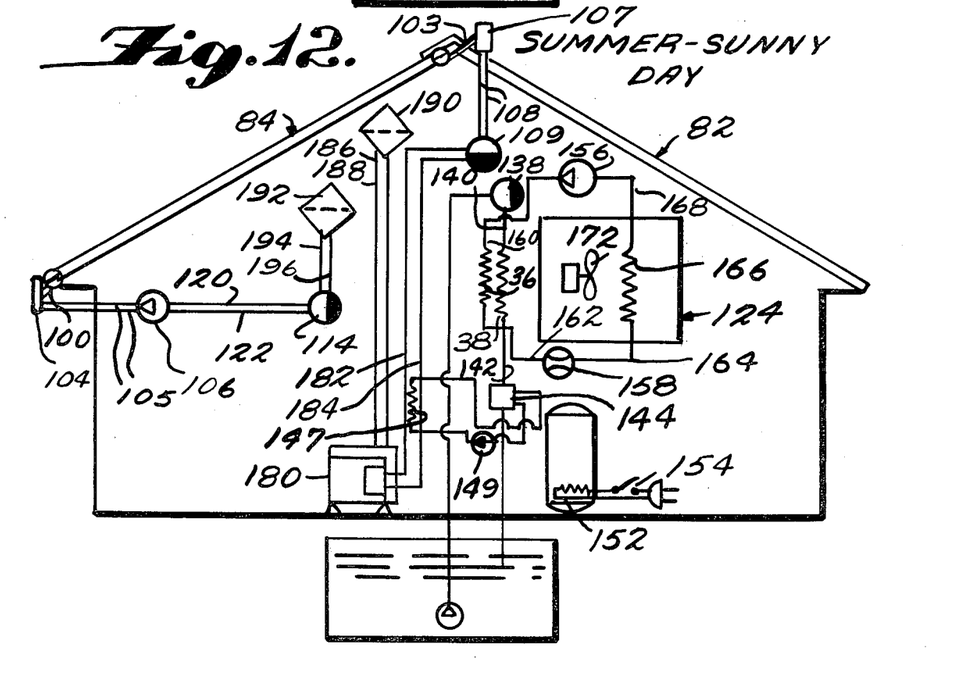
FIG. 12 is a schematic view similar to FIG. 7 illustrating the working components of the system in conditions represented by a summer sunny day.

FIG. 11 illustrates the connection of the circuitry during cloudy summer dyas or summer nights. The set-up is basically similar to the winter cloudy day or night set-up illustrated in FIG. 10, except that in this cases the heat pump is run in the reverse mode so that passageway 36 of the heat exchanger 10 receives the compressed refrigerant from the compressor 156 and the coil 166 which receives the refrigerant from the expansion valve assembly 158 provides the necessary room air cooling effect. To this end, only the duct section 128 is embodied in the room air circuit. In this case, the heated compressed refrigerant in he passageway 36 is cooled by heat exchange with passages 34 and 40 of the heat exchanger 10 containing the circulating solar panel air. Preferably, pump 134 is shut down.

Preferably pump 134 circulates storage water from 132 to valve 138, coil 170, and by-passes 146 through 144 to develop a cool supply of storage water for operation during the next day.

During the day, the heat pump circuit remains in operation except that cooling for the coil 36 of the refrigerant circuit is provided by the water circuit. In addition the valves 108 and 114 of the solar panel circuit are actuated so as to break the closed circuit and cause fan 106 to draw atmospheric air through inlet pipe 198 and to direct the air through 98 to channels 87, into line 184 leading to the clothes drier 180. This heated air is either used in the clothes drier 180 and then vented to atmosphere through the air vent 190, or it is vented directly to the atmosphere through vent 190 by means of line 186. To maintain the supply of heated water for the hot water heater 150, heat is added by actuating pump 149 and heat exchanger 147 so as to establish the closed circuit through 146.

It will be understood that the preferred circuit logic for operation of the pumps, valves, fans, and other components of this system corresponds to my co-pending application Ser. No. 32,636, filed April 25, 1979, now U.S. Pat. No. 4,265,220, incorporated herein, which is to utilize a microcomputer to maximize the annual system coefficient of performance.

The system described above illustrates the utilization of the heat exchanger assembly 10 of the present invention which achieves significant advantages. The construction as thusfar illustrated and described is desirable since the fluid pressures contained within the four passageways 34, 36, 38 and 40 are relatively low. The heat exchanger illustrated in FIGS. 13-20 illustrates constructional modifications which render the heat exchanger particularly suitable for handling fluid mediums under high pressure conditions such as might be encountered in pressure operated heat engines and the like. Examples of applications of this type are disclosed in the aforesaid parent application of which the present application is a continuation-in-part. Accordingly, for these purposes the disclosure of the aforesaid application is hereby incorporated by reference into the present specification.

Figure 13:
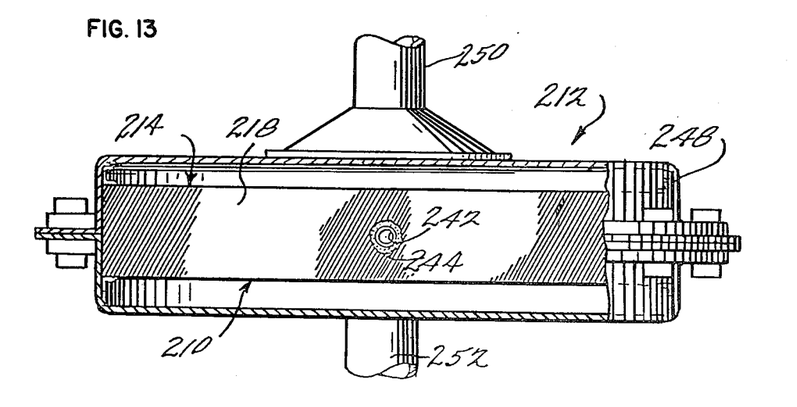
FIG. 13 is a side elevational view of a view exchanger of modified form with parts broken away embodying the principles of the present invention.
Figure 14:
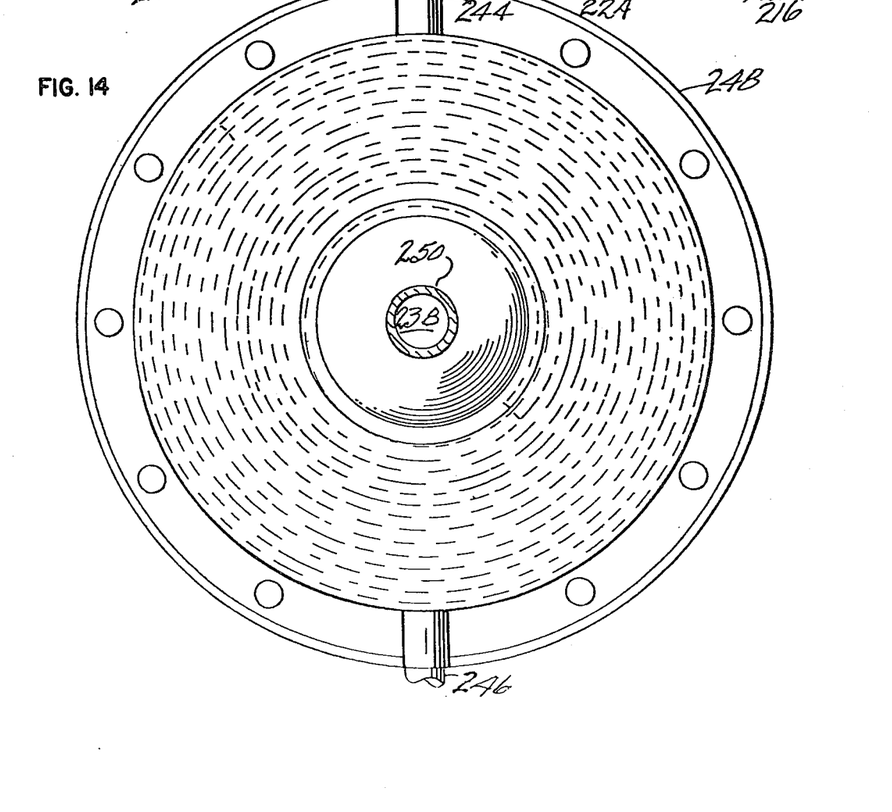
FIG. 14 is a top plan view of the assembly shown in FIG. 13.
Figures 15, 16, 17:
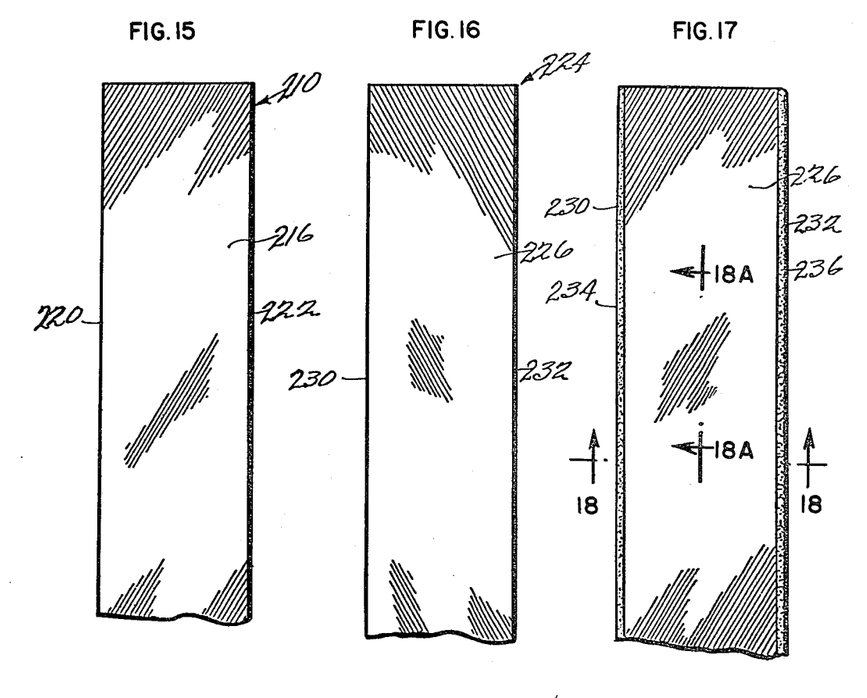
FIG. 15 is a fragmentary plan view of a length of strip utilized in constructing the heat exchanger assembly shown in FIGS. 13 and 14.
FIG. 16 is a view similar to FIG. 15 showing another strip.
FIG. 17 is a similar view of the two strips mounted together in transversely aligned layer relation illustrating the manner in which each adjacent pair of end edges is sealingly secured together.

Referring now more particularly to FIGS. 13-20 of the drawings, there is shown in FIG. 15 an elongated strip, generally indicated at 210, which constitutes a preferred form of thin imperforate web of rigid heat conducting material utilized in constructing the apparatus of the present invention. A preferred form of the apparatus of the present invention is illustrated in FIGS. 13 and 14 as a heat exchanger, generally indicated at 212, of a type wherein the heat of one fluid is operable to be exchanged with another fluid. The heat exchanger 212 includes a main components 214 which provides the separate flow paths for both of the fluids and contains the separating heat conducting material through which the heat exchange takes place. In accordance with the principles of the present invention this main component 214 is formed of a plurality of thin webs such as the strip 210. In the preferred embodiment shown in FIG. 15 the strip 210 has a pair of relatively wide opposed surfaces, indicated at 216 and 218, bounded in the longitudinal direction of extent of the strip 210 by a pair of spaced relatively thin end edges 220 and 222. The strip 210 may be made of any suitable rigid heat conducting material, preferred materials being those having a relatively low weight and relatively high specific heat, such as aluminum, magnesium and titanium, and particularly alloys and compounds containing boron, carbon, lithium, beryllium, hydrogen, silicon and nitrogen.

In accordance with the principles of the present invention, the strip 210 has each of the surfaces 216 and 218 formed into a non-planar configuration which includes passage defining portions and force transmitting portions. While the provision of surface irregularities may be effected by any well-known means, in the preferred embodiment shown, the surface irregularity is provided by a conventional knurling process, the knurling tool imparting to the surface 216, as shown, a multiplicity of ridges and troughs which extend from one end edge 220 to the other end edge 222 at an angle thereto. As shown, the angle may be 45° more or less and, as shown, is aproximately 30° with respect to the end edges. It is important to note that both the surface 216, as shown in FIG. 15, as well as the opposite surface 218 (see FIG. 18) are provided with the knurled ridges and troughs and that the ridges and troughs on the surface 218 extend angularly from the end edge 220 to the other end edge 222 at substantially the same angle as the ridges and troughs of the surface 218, In FIG. 16 there is illustrated a second strip 224 which is similar to the strip 210 previously described in that it includes opposite surfaces 226 and 228 knurled with parallel ridges and troughs and opposite end edges 230 and 232. The strip 224 differs from the strip 210 in that the ridges and troughs on each of the surfaces 226 and 228 extend in the opposite direction than those of the strip 210.

In fabricating the main component 214 of the preferred heat exchanger 212, there are two webs utilized, namely strip 210 and strip 224. These strips are disposed in generally transverse aligned relation with respect to one another in superposed relation with the surface 216 of the strip 210 facing the surface 228 of strip 224. The ridges of the abutting surfaces 216 and 228 will cross one another and the points or areas where the ridges touch one another constitute the force transmitting portions of the surfaces 216 and 228 while the remaining portion of the ridges and troughs constitute the passage defining portions of the surfaces 216 and 228. The end edges 220 and 230 of the strips 210 and 224 are disposed in adjacent relation to one another and are sealingly secured together, as by a line of weld or brazing material, indicated at 234. Likewise the other end edges 222 of strip 210 and 232 of strip 224, which are adjacent one another, are sealingly secured by a line of weld or brazing material 236.

It is important to note that the sealing securement of both longitudinal end edges provided by the lines of brazing material 234 and 236 serves to define with the passage defining portions of the facing surfaces 216 and 228 a first fluid passage having a flow direction extending generally in the longitudinal direction of the two strips.

Figures 18, 19:
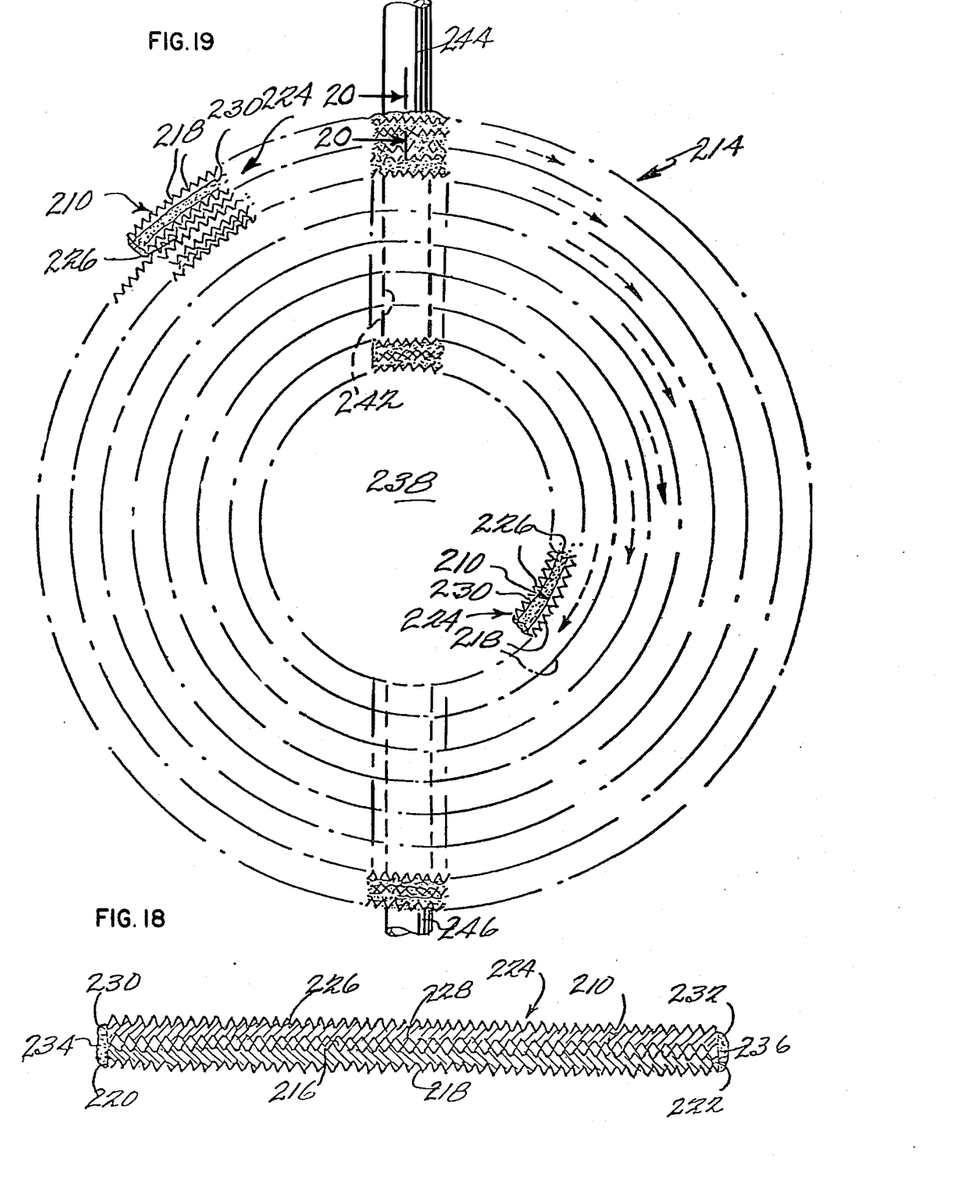
FIG. 18 is an enlarged sectional view taken along the line 18—18 of FIG. 17.
FIG. 19 is a top plan view showing the manner in which the dual strip construction illustrated in FIGS. 17 and 18 is wound into a spiral coil formation and provided with inlet and outlet mainfold spaces for the passage of fluid therethrough.
Figure 20:
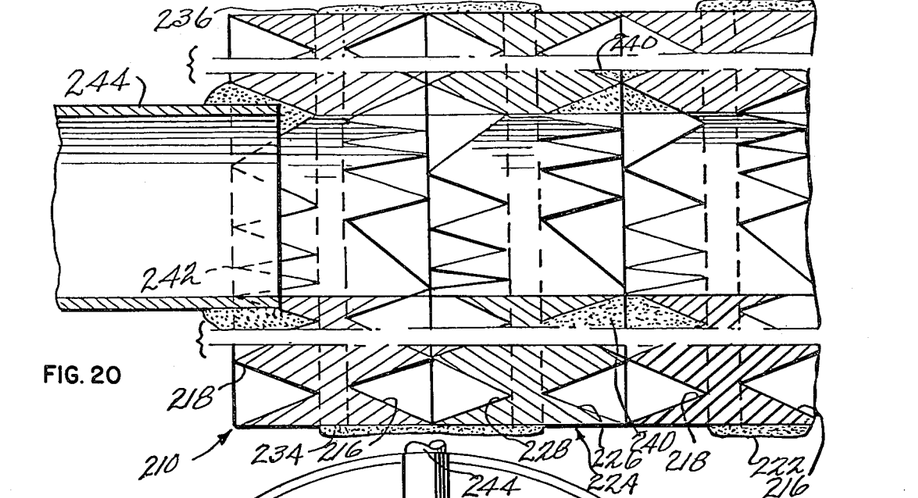
FIG. 20 is an enlarged fragmentary sectional view taken along the line 20—20 of FIG. 19.

It is an important aspect of the present invention to achieve a turbulent flow characteristic of the fluid moving through the passage. With the regular corrugated configuration of the ridges and troughs illustrated in FIG. 18, the total open cross-sectional area of the passage provided by the passage defining portions of the surfaces 216 and 228 is constant in the direction of fluid flow (X axis). However, because of the opposite angular extent of the ridges and troughs of surface 216 with respect to those of the surface 228, the cross-sectional area constantly changes as the fluid progresses in the direction of flow. FIG. 18 illustrates one extreme configuration which is presented when the flow is along a plane passing through the interengaging force transmitting portions of the surfaces 216 and 228. The configuration consists of a series of diamond-shaped openings touching one another at adjacent mid-points. The cross-sectional configuration when the flow reaches a plane halfway between the plane shown in FIG. 18 and the plane of the next series of force transmitting portions is in the form of a continuous opening of constant thickness in the form of a straight sine wave. Consequently, the position of the open areas defining the passage in the transverse direction (Y axis) and in the direction of thickness (Z axis) is constantly changing as the distance along the direction of travel (X axis) increases. It will be noted that there is theoretically no straight through flow path along an X axis provided. Since the ridges and troughs are of similar outline form in section irrespective of whether the section is taken along a place perpendicular to the longitudinal extent of the strips, as indicated at 18—18 in FIG. 17, or along the longitudinal extent as indicated at 18a—18a, it can be seen that the cross-section of the passage between the surfaces 216 and 228 in the direction of flow constantly varies between the two extreme configurations previously described as the fluid moves along the Y axis. It will be noted that the passage defining surfaces having the sine wave configuration are such as to direct the flow along a sinusoidal path in which the direction of movement has a constant direction X axis component with a Z axis component which changes directions periodically going through zero between direction changes. On the other hand, the passage defining surfaces having the configuration shown in FIG. 18 are such as to direct the flow along intermittent paths in which each path has a constant direction X axis component with one-half having a Y axis component in one direction and the other half having a Y axis component in the other direction. Moreover, since the cross-section between the pair of corrugated surfaces 216 and 228 in the X-Y plane varies between the aforesaid extreme configurations in the Y axis direction, the flow components in the Y and Z axis directions provide a progressive intermixing of fluid flow in both of these directions throughout the passage face to the outlet face. Moreover, it will be noted that the lines of brazing 234 and 236 have a Y axis component direction reversal function. The total effect is a fluid flow which has an X axis component in only one direction, namely, generally along the longitudinal extent of the strips, and a superimposed Y axis component and Z axis component which periodically changes direction and passes through zero throughout. The constantly varying Y and Z axis components insure a high degree of turbulence throughout without the establishment of laminar flow. This highly turbulent non-laminar flow is maintained in passages having controlled constant cross-section throughout in the direction of flow.

Referring now more particularly to FIG. 19, the main component 214 of the heat exchanger 212 is formed by tightly winding the pair of elongated strips 210 and 224 secured together with the lines of brazing material 234 and 236 into a spiral coil formation about an inner core member 238 which serves to support the interior surface of the interior loop provided by the surface 226. It will be noted that during this winding action as each successive loop is wound in the coil formation, the interior surface 226 provided by strip 224 of the pair of strips will be moved into facing relation with the exterior surface 218 provided by strip 210 of the pair of strips in the preceding adjacent loop. During the winding of the coil formation a wafer of brazing material is inserted between these two surfaces 218 and 226 at diametrically opposed positions about the axis of the member 238 so that when the entire spiral coil formation is completed as shown in FIG. 19, the coil formation can be placed in a furnace and the wafers of brazing material will fuse in the diametrically opposed areas of the coil formation. After the brazing material has fused, as indicated at 240 in FIG. 20, the coil formation is drilled or otherwise provided with a radially inwardly extending manifold passage 242 at each of the diametrically opposed positions. As can be clearly seen from FIG. 20, each manifold passage 242 thus communicates with the first passage defined by the facing surfaces 216 and 228 extending between the lines of brazing material 234 and 236 whereas the remaining facing surfaces 218 and 226 are maintained out of communication with the manifold opening 242 by means of the fused brazing material 240. The arrangement, therefore, permits the mounting of an inlet pipe 244 in the radially outward end of one of the mainfold openings 242 and an outlet pipe 246 in the radially outward end of the other manifold 242. With this arrangement a fluid introduced into the inlet pipe 244 will flow into the associated manifold 242 and enter the first passages provided between the surfaces 216 and 228 and the lines of brazing material 234 and 236 so as to flow in both directions along the longitudinal extent of the strips away from the manifold and toward the opposite manifold 242. From the opposite manifold 242 the fluid flows out of the discharge pipe 246.

In this way the main component 214 of the heat exchanger apparatus 212 is preferably fabricated. For purposes of providing exchange of heat from a fluid flowing from the inlet 244 to the outlet 246 the apparatus further includes an exterior housing 248 which provides for peripheral support of the exterior surface 218 of the outer loop of the coil formation. The housing 248 includes an inlet pipe 250 on one side of the coil formation extending into the adjacent side of the housing and an outlet pipe 252 on the opposite side of the coil formation extending outwardly from the adjacent side of the housing. Heated fluid introduced into the inlet pipe 250 will therefore pass through the passages defined by the passage defining portions of the surfaces 218 and 226 facing one another. While the transverse flow through these passages is similar to the longitudinal flow through the passages defined by the ridges and troughs of the facing surfaces 216 and 228, a difference exists because of the lack of the lines of brazing material 234 and 236 and hence lack of the Y axis reversal function thereof. Thus, the flow transversely through the passages defined by the facing surfaces 216 and 228, while turbulent, will tend to stratify in the direction of extent of the troughs since the ends of the troughs are not blocked as is the case with the lines of brazing material 234 and 236, but rather are open to both the inlet and outlet side of the fluid flow path.

It will be understood that the preferred construction described above is susceptible to many variations. For example, rather than utilizing strips 210 and 214 having oppositely directed ridges and troughs in both surfaces with respect to one another, the plurality of strips utilized could be identical with each strip having the ridges and troughs on one surface extending oppositely from the ridges and troughs on the opposite surface. Likewise, while a strip form of web is preferred, the webs may be sheets if desired. Moreover, the surface irregularities may assume other patterns than the preferred ridge/trough arrangement so long as there are provided in the two facing surfaces passage defining portions and force transmitting portions. Moreover, the main component 214 can be formed in a layer formation other than the spiral coil formation of the preferred embodiment (e.g. stack or helical coil). The important consideration here is that the force transmitting portions of the exterior surfaces when disposed in layer formation are mounted in force transmitting relation in the same way as the force transmitting portions of the interior surface are. By arranging the webs in a layer formation in which the force transmitting portions of each pair of facing surfaces are disposed in force transmitting relation with respect to one another in the direction the facing surfaces face one another, it becomes possible to minimize the amount of heat conductive material that is utilized to form the main component 214. In this way, the forces created by the fluid pressure and temperature conditions within the fluid passages tending to deform the webs in the facing directions are resisted so as to prevent deformation beyond the elastic limit of the material which would otherwise occur in the absence of such force transmitting relationship. In short, the arrangement permits the utilization of wall thickness less than that required to be self-sustaining in order to prevent such deformation. It can thus be seen that there is provided with the present arrangement a minimum amount of heat conductive material between the fluid passages for the fluids to be passed in heat exchange relation to one another. Minimizing the amount of heat conductive material optimizes the heat transfer. Moreover, by maximizing the turbulence of flow, heat transfer is further optimized. Finally, it is desirable to provide a high surface-to-volume ratio with respect to the fluid passages provided. With the present arrangement an optimized surface-to-volume ratio is provided which also serves to optimize heat transfer.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A multiple fluid medium solar energy system for a building comprising
solar panel means for mounting exteriorly of the building having passage means for directing a flow of air therethrough and means for enabling (1) environmentally available solar energy to heat the flowing air and (2) the flowing air to give up heat to the environment when solar energy is not available and temperature conditions are favorable therefor,
interior room air temperature conditioning means for mounting interiorly of said building including return air inlet means for receiving room air to be temperature conditioned, room air outlet means for discharging a supply of temperature conditioned air and blower means for effecting a flow of room air from said return air inlet means to said room air outlet means,
first heat exchanger means including first flow path means for the air flowing from said return air inlet means to said room air outlet means, second flow path means in heat exchange relation to said first flow path means and third and fourth flow path means in heat exchange relation with one another,
second heat exchanger means having fifth flow path means selectively connected in series with said first flow path means and disconnected therefrom and sixth and seventh flow path means in heat exchange relation to said fifth flow path means, means defining a temperature storage water circuit including insulated water storage tank means, pump means for pumping water from said storage tank means and water return means for directing water into said storage tank means, and means for directing water from said pump means to said water return means alternatively (1) through said second flow path means or (2) said sixth flow path means, heat pump means defining a closed refrigerant flow circuit through said third flow path means and said seventh flow path means and including means for alternatively (1) compressing the refrigerant from said third flow path means into said seventh flow path means and expanding the refrigerant from said seventh flow path means into said third flow path means or (2) compressing the refrigerant from said seventh flow path means into said third flow path means and expanding the refrigerant from said third flow path means into said seventh flow path means, and means defining (1) an environmental air circuit through said solar panel passage means including environmental air inlet means, environmental air outlet means and blower means for causing a flow of air from said environmental air inlet means through said solar panel passage means into said environmental air outlet means and alternatively (2) a closed air circuit through said solar panel passage means, said fourth flow path means and said blower means, said environmental air circuit defining means including hot air clothes dryer means between said solar panel passage means and said environmental air outlet means.

2. A multiple fluid medium solar energy system for a building comprising solar panel means for mounting exteriorly of the building having passage means for directing a flow of air therethrough and means for enabling (1) environmentally available solar energy to heat the flowing air and (2) the flowing air to give up heat to the environment when solar energy is not available and temperature conditions are favorable therefor, said solar panel means including a plurality of panel structures each comprising a multiplicity of elongated thin wall sections defining a multiplicity of elongated parallel passages constituting said passage means, said multiplicity of passages of each panel structure including a row of outer passages and a row of inner passages, outer passage mainfold means for directing air into and out of the rows of outer passages of said panel structures, inner passage manifold means for directing air into and out of the rows of inner passages of said panel structures, interior room air temperature conditioning means for mounting interiorly of said building including return air inlet means for receiving room air to be temperature conditioned, room air outlet means for discharging a supply of temperature conditioned air and blower means for effecting a flow of room air from said return air inlet means to said room air outlet means, first heat exchanger means including first flow path means for the air flowing from said return air inlet means to said room air outlet means, second flow path means in heat exchange relation to said first flow path means and third and fourth flow path means in heat exchange relation with one another, second heat exchanger means having fifth flow path means selectively connected in series with said first flow path means and disconnected therefrom and sixth and seventh flow path means in heat exchange relation to said fifth flow path means, means defining a temperature storage water circuit including insulated water storage tank means, pump means for pumping water from said storage tank means and water return means for directing water into said storage tank means, and means for directing water from said pump means to said water return means alternatively (1) through said second flow path means or (2) said sixth flow path means, heat pump means defining a closed refrigerant flow circuit through said third flow path means and said seventh flow path means and including means for alternatively (1) compressing the refrigerant from said third flow path means into said seventh flow path means and expanding the refrigerant from said seventh flow path means into said third flow path means or (2) compressing the refrigerant from said seventh flow path means into said third flow path means and expanding the refrigerant from said third flow path means into said seventh flow path means, and means defining (1) an environmental air circuit through said solar panel passage means including environmental air inlet means, environmental air outlet means and blower means for causing a flow of air from said environmental air inlet means through said solar panel passage means into said environmental air outlet means and alternatively (2) a closed air circuit through said solar panel passage means, said fourth flow path means and said blower means, said closed air flow circuit defining means including means for selectively directing the air flow through (1) said inner pasage manifold means and said inner passages or (2) said outer passage manifold means and said outer passages.

3. A solar energy system as defined in claim 1 or 2 wherein said means for alternatively compressing and expanding the refrigerant in said closed refrigerant circuit comprises a reversible compressor unit and a reversible expansion valve means.

4. A solar energy system as defined in claim 1 or 2 including a portable hot water circuit comprising a hot water supply tank, means for connecting said supply tank with a source of unheated water under pressure, means connecting said supply tank for supplying hot water therefrom upon demand, and heating coil means within said supply tank in heat exchange relation to the unheated water supplied thereto, said temperature storage water circuit including means for selectively directing the water flowing to said water return means through said heating coil means.

5. A solar energy system as defined in claim 4 wherein said hot water supply tank includes selectively energizable electric heating means therein in heat exchange relation with the unheated water supplied thereto.

* * * * *